United States Patent
Yamano

(10) Patent No.: US 12,391,139 B2
(45) Date of Patent: Aug. 19, 2025

(54) FUEL MANAGEMENT DEVICE, FUEL MANAGEMENT SYSTEM, FUEL MANAGEMENT METHOD, AND STORAGE MEDIUM

(71) Applicant: HONDA MOTOR CO., LTD., Tokyo (JP)

(72) Inventor: Naoki Yamano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 18/105,895

(22) Filed: Feb. 6, 2023

(65) Prior Publication Data
US 2023/0302939 A1 Sep. 28, 2023

(30) Foreign Application Priority Data
Mar. 22, 2022 (JP) .................................. 2022-045437

(51) Int. Cl.
*B60L 53/00* (2019.01)
*B60L 53/62* (2019.01)
(Continued)

(52) U.S. Cl.
CPC ............... *B60L 53/62* (2019.02); *B60L 53/65* (2019.02); *B60L 53/66* (2019.02); *B60L 53/67* (2019.02); *B60L 53/68* (2019.02); *B60L 58/30* (2019.02)

(58) Field of Classification Search
CPC .......... B60L 53/62; B60L 53/65; B60L 53/66; B60L 53/67; B60L 53/68; B60L 58/30;
(Continued)

(56) References Cited

U.S. PATENT DOCUMENTS

| | | | |
|---|---|---|---|
| 2004/0172172 A1* | 9/2004 | Kubota | ................... G06F 17/00 701/1 |
| 2011/0093305 A1* | 4/2011 | Alexander | ............. G06Q 10/00 705/7.13 |

(Continued)

FOREIGN PATENT DOCUMENTS

| | | |
|---|---|---|
| JP | 2016-183768 | 10/2016 |
| JP | 2021-105932 | 7/2021 |
| JP | 2021-110547 | 8/2021 |

OTHER PUBLICATIONS

W. Sun and G. P. Harrison, "Active Load Management of Hydrogen Refuelling Stations for Increasing the Grid Integration of Renewable Generation," in IEEE Access, vol. 9, pp. 101681-101694, 2021, doi: 10.1109/ACCESS.2021.3098161. (Year: 2021).*

(Continued)

*Primary Examiner* — Russell Frejd
*Assistant Examiner* — Brittany Renee Peko
(74) *Attorney, Agent, or Firm* — Amin, Turocy & Watson, LLP

(57) ABSTRACT

A fuel management device includes a residual amount information acquisition part configured to acquire residual amount information indicating a residual amount of hydrogen fuel of each of a plurality of vehicles that are previously registered, a vehicle identification part configured to identify a refueling target vehicle in which a residual amount of hydrogen fuel is a threshold or less on the basis of the residual amount information of each vehicle, an estimation part configured to estimate a supply amount of hydrogen fuel in supply facility of hydrogen fuel on the basis of a refueling amount of hydrogen fuel to be refueled to each of the refueling target vehicles, and an output controller configured to output information to an output part based on the estimation result of the estimation part.

7 Claims, 5 Drawing Sheets

(51) Int. Cl.
  *B60L 53/65* (2019.01)
  *B60L 53/66* (2019.01)
  *B60L 53/67* (2019.01)
  *B60L 53/68* (2019.01)
  *B60L 58/30* (2019.01)

(58) Field of Classification Search
  CPC .......... B60L 2240/622; B60L 2240/70; B60L 2240/72; B60L 53/63; Y02E 60/32; B60S 5/02; F17C 5/06; F17C 2221/012; F17C 2250/032; F17C 2250/034; F17C 2250/038; F17C 2250/0421; F17C 2250/0426; F17C 2250/0615; F17C 2250/0621; F17C 2250/0694; F17C 2265/065

See application file for complete search history.

(56) References Cited

U.S. PATENT DOCUMENTS

| | | | |
|---|---|---|---|
| 2019/0016312 A1 | 1/2019 | Carlson et al. | |
| 2019/0178664 A1* | 6/2019 | Dudar | G01C 21/3469 |
| 2019/0308510 A1* | 10/2019 | Beaurepaire | B60L 11/1861 |
| 2020/0070680 A1* | 3/2020 | Whaling | B60L 53/64 |
| 2020/0376975 A1* | 12/2020 | Martin | B60L 53/60 |
| 2021/0199451 A1 | 7/2021 | Murata et al. | |
| 2022/0281422 A1* | 9/2022 | Jourdy | B60S 5/02 |
| 2023/0281731 A1* | 9/2023 | Takahashi | G06Q 50/06 |

OTHER PUBLICATIONS

Japanese Notice of Allowance for Japanese Patent Application No. 2022-045437 mailed Jan. 9, 2024.

* cited by examiner

FUEL MANAGEMENT DEVICE, FUEL MANAGEMENT SYSTEM, FUEL MANAGEMENT METHOD, AND STORAGE MEDIUM

CROSS-REFERENCE TO RELATED APPLICATION

Priority is claimed on Japanese Patent Application No. 2022-045437, filed Mar. 22, 2022, the content of which is incorporated herein by reference.

BACKGROUND OF THE INVENTION

Field of the Invention

The present invention relates to a fuel management device, a fuel management system, a fuel management method, and a storage medium.

Description of Related Art

In recent years, in order to reduce a bad influence on the global environment, regulation of exhaust gases of automobiles has further advanced. For this reason, for example, fuel cell vehicles using fuel cells are becoming popular. A fuel cell vehicle travels using a driving force of a motor driven by electric energy generated by a chemical reaction of hydrogen and oxygen. Hydrogen fuel is used as fuel for the fuel cell vehicle. The hydrogen fuel is produced in a hydrogen station and supplied to the fuel cell vehicle. For this reason, a user of the fuel cell vehicle goes to the hydrogen station and refuels the fuel cell vehicle with hydrogen fuel.

As a related technology, for the purpose of reducing a time required until filling of hydrogen gas at a hydrogen station starts, a technique for requesting a hydrogen station to perform pretreatment for filling a hydrogen gas storage part provided in a fuel cell vehicle with hydrogen gas is known (for example, see Japanese Unexamined Patent Application, First Publication No. 2021-110547).

SUMMARY OF THE INVENTION

However, in the related art, in the hydrogen station, sometimes, it was not possible to understand the extent of demand for hydrogen fuel, and sometimes, prospects for hydrogen fuel sales could not be set. For example, sometimes, it was not possible to sell hydrogen fuel efficiently.

An aspect of the present invention is directed to supporting efficient sale of hydrogen fuel.

A fuel management device, a fuel management system, a fuel management method, and a storage medium according to the present invention employ the following configurations.

(1) A fuel management device according to an aspect of the present invention includes a residual amount information acquisition part configured to acquire residual amount information indicating a residual amount of hydrogen fuel of each of a plurality of vehicles that are previously registered; a vehicle identification part configured to identify a refueling target vehicle in which a residual amount of hydrogen fuel is a threshold or less on the basis of the residual amount information of each vehicle; an estimation part configured to estimate a supply amount of hydrogen fuel in supply facility of hydrogen fuel on the basis of a refueling amount of hydrogen fuel to be refueled to each of the refueling target vehicles; and an output controller configured to output information based on the estimation result of the estimation part to an output part.

(2) In the aspect of the above-mentioned (1), the fuel management device includes a positional information acquisition part configured to acquire positional information of each of the plurality of vehicles; and a facility identification part configured to identify the supply facility that refuels the refueling target vehicle with hydrogen fuel on the basis of the positional information of the refueling target vehicle, and the estimation part estimates the supply amount in the supply facility identified by the facility identification part.

(3) In the aspect of the above-mentioned (1) or (2), the fuel management device includes a transmission controller configured to transmit notice information that prompts to refuel the refueling target vehicle with hydrogen fuel on the basis of the estimation result.

(4) In the aspect of any one of the above-mentioned (1) to (3), the vehicle identification part changes a threshold on the basis of a history of a residual amount when refueling for each vehicle and identifies the refueling target vehicle by using the changed threshold.

(5) In the aspect of any one of the above-mentioned (1) to (4), the output controller outputs to the output part information indicating that hydrogen fuel of an excess portion is able to be supplied for uses other than supply to the vehicle as the information based on the estimation result when an excess of a predetermined amount or more occurs in the supply amount estimated by the estimation part.

(6) A fuel management system according to an aspect of the present invention is a fuel management system including a plurality of vehicles that are previously registered and a fuel management device configured to manage a residual amount of hydrogen fuel of each of the plurality of vehicles, and the fuel management device includes: a residual amount information acquisition part configured to acquire residual amount information indicating a residual amount of hydrogen fuel of each of the plurality of vehicles; a vehicle identification part configured to identify a refueling target vehicle in which a residual amount of hydrogen fuel is a threshold or less on the basis of the residual amount information of each vehicle; an estimation part configured to estimate a supply amount of hydrogen fuel in supply facility of hydrogen fuel on the basis of a refueling amount of hydrogen fuel to be refueled to each of the refueling target vehicles; and an output controller configured to output information based on the estimation result of the estimation part to an output part.

(7) A fuel management method according to an aspect of the present invention is executed by a computer of a fuel management device, the method including: a residual amount information acquisition step of acquiring residual amount information indicating a residual amount of hydrogen fuel of each of a plurality of vehicles that are previously registered; a vehicle identification step of identifying a refueling target vehicle in which a residual amount of hydrogen fuel is a threshold or less on the basis of the residual amount information of each vehicle; an estimation step of estimating a supply amount of hydrogen fuel in supply facility of hydrogen fuel on the basis of a refueling amount of hydrogen fuel to be refueled to each of the refueling target vehicles; and an output control step of outputting information based on the estimation result of the estimation step to an output part.

(8) A storage medium according to an aspect of the present invention is a computer-readable non-transient storage medium, on which a program is stored to execute processing in a computer of a fuel management device, the processing including: acquiring residual amount information indicating a residual amount of hydrogen fuel of each of a plurality of vehicles that are previously registered; identifying a refueling target vehicle in which a residual amount of hydrogen fuel is a threshold or less on the basis of the residual amount information of each vehicle; estimating a supply amount of hydrogen fuel in supply facility of hydrogen fuel on the basis of a refueling amount of hydrogen fuel to be refueled to each of the refueling target vehicles; and outputting information based on the estimation result estimated to an output part.

According to the aspects of the above-mentioned (1) to (8), it is possible to help to sell hydrogen fuel efficiently.

DETAILED DESCRIPTION OF THE INVENTION

Hereinafter, embodiments of a fuel management device, a fuel management system, a fuel management method, and a program of the present invention will be described with reference to the accompanying drawings.

[Configuration of Fuel Management System 1]

Figure 1:
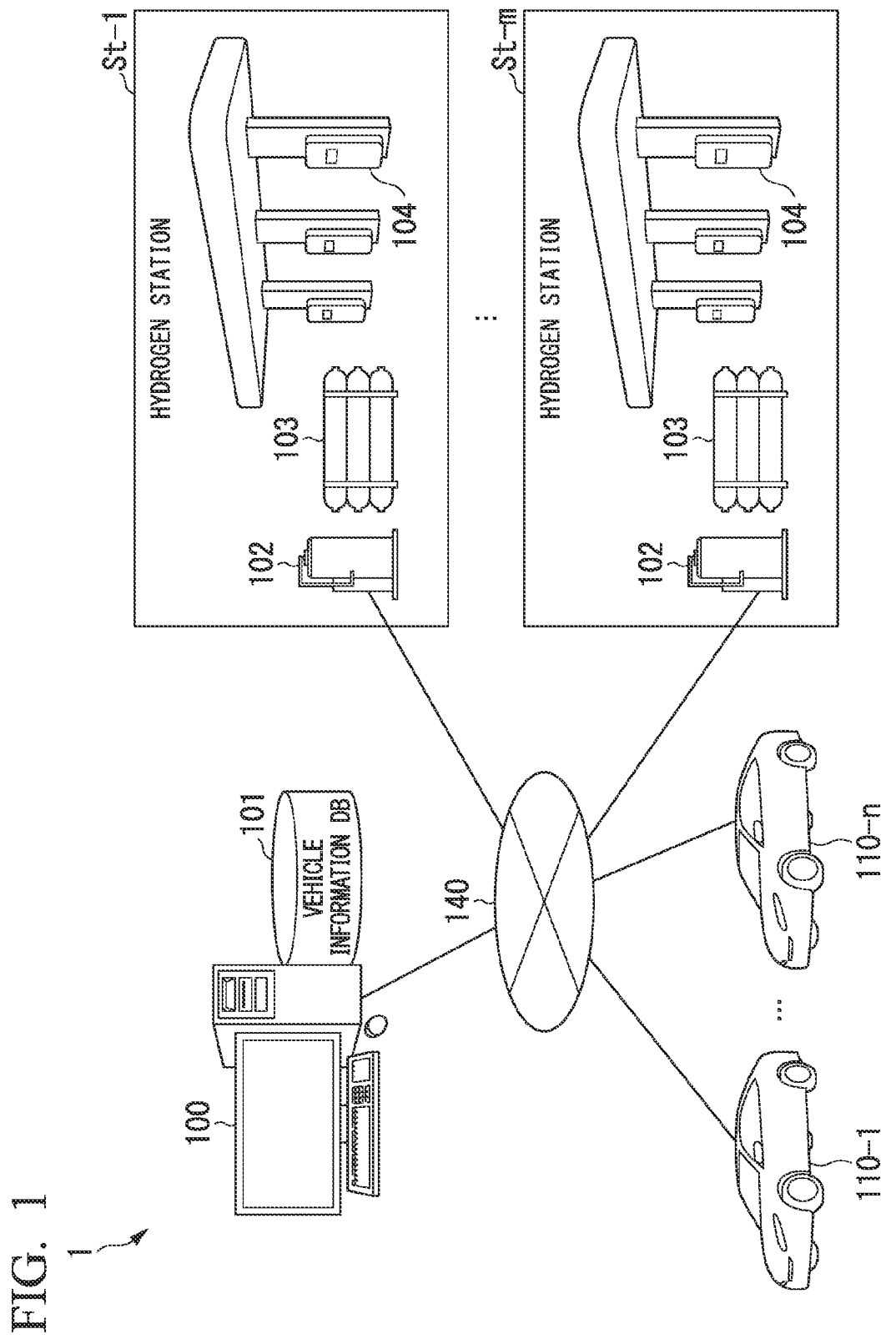
FIG. 1 is a view showing a configuration of a fuel management system according to an embodiment.

FIG. 1 is a view showing a configuration of a fuel management system 1 according to an embodiment. In FIG. 1, the fuel management system 1 includes a fuel management device 100, hydrogen fuel generating devices 102, and vehicles 110 (110-1 to 110-n). The devices can communicate with each other via a network 140. The fuel management device 100 and the vehicles 110 (information processing devices included in the vehicles 110) include central processing units (CPUs), read only memories (ROMs), random access memories (RAMs), communication units, and the like.

The fuel management device 100 manages the hydrogen fuel generating devices 102. The hydrogen fuel generating devices 102 are disposed in hydrogen stations St (St-1 to St-M). The hydrogen stations St are facilities configured to supply hydrogen fuel. The hydrogen stations St-1 to St-M are affiliated stores operated by a headquarters company. Further, in the fuel management system 1, the number of stores of the hydrogen stations St is not limited to plural, and may be one. In addition, the hydrogen stations St may be disposed in truck yards in which loading and unloading or transshipment of luggage in commercial trucks is performed.

The hydrogen fuel generating devices 102 electrolyze water to generate hydrogen fuel using electric power of renewable energy such as solar photovoltaic power generation, wind power generation, or the like. For this reason, when the excess amount of the produced hydrogen fuel is too large compared to the hydrogen fuel supplied to the vehicle, loss related to the work or process required for water electrolysis may occur, and efficient utilization of the energy may not be possible. Further, the hydrogen fuel generating devices 102 may generate hydrogen fuel by steam-reforming city gas (methane) or liquefied petroleum gas (LPG).

The hydrogen stations St includes a pressure accumulator 103, a dispenser 104, and the like, in addition to the hydrogen fuel generating devices 102. The pressure accumulator 103 stores hydrogen fuel. The dispenser 104 includes a nozzle or a control panel configured to fill the vehicles 110 with hydrogen fuel, and measures a filler content while observing a flow rate or a temperature. The nozzle is configured to mesh with a socket (receptacle) of the vehicle 110, and even after refueling, is not removed until the pressure is reduced.

The fuel management device 100 manages a production output of the hydrogen fuel generated by the hydrogen fuel generating devices 102 or a storage amount accumulated in the pressure accumulator 103, and manages an amount of the hydrogen fuel dispensed from the dispenser 104. In addition, the fuel management device 100 includes a vehicle information DB (database) 101. While it will be described below in detail using FIG. 4, the vehicle information DB 101 stores a residual amount of the hydrogen fuel of each of the vehicles 110, positional information of each of the vehicles 110, or the like.

The vehicle 110 is a fuel cell vehicle. In the embodiment, while the vehicle 110 is an ordinary automobile (for example, a 2-ton truck), it may be a large-sized automobile, a two-wheeled vehicle, a motor tricycle, a sidecar, or the like. An amount of the hydrogen fuel upon full tank is, for the convenience of description, for example, uniformly 5000 g (125 liters). Further, hereinafter, the amount of hydrogen fuel is described in terms of weight (g), but it is also possible to be expressed in terms of volume (liter).

The vehicle 110 includes a detector configured to detect a residual amount of the hydrogen fuel. In addition, the vehicle includes a global positioning system (GPS) unit configured to detect positional information of a host vehicle. The vehicle 110 includes an information processing device such as a navigation device or the like, which periodically transmits a residual amount of the hydrogen fuel or positional information showing a current position thereof to the fuel management device 100.

[Software Configuration of Fuel Management Device 100]

Figure 2:
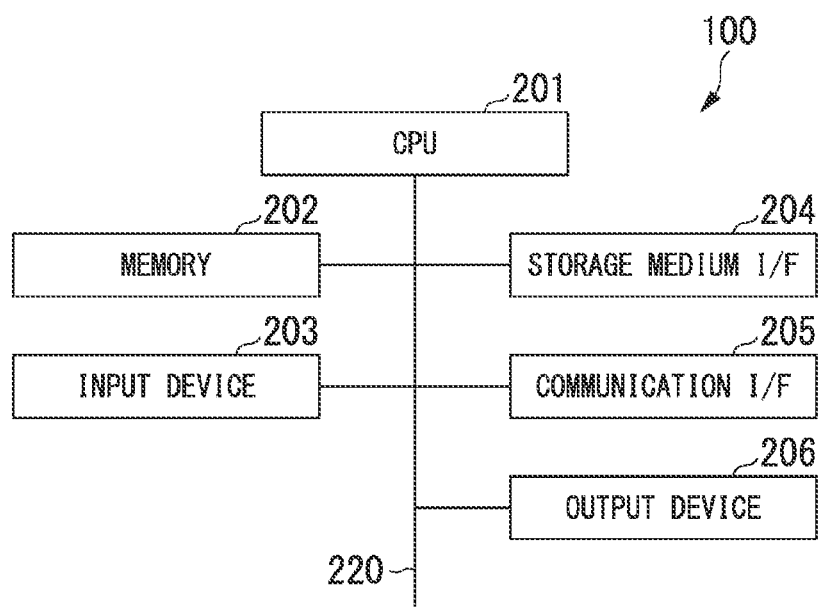
FIG. 2 is a block diagram showing an example of a hardware configuration of a fuel management device.

FIG. 2 is a block diagram showing an example of a hardware configuration of the fuel management device 100. In FIG. 2, the fuel management device 100 includes a CPU 201, a memory 202, an input device 203, a storage medium I/F (interface) 204, a communication I/F 205, and an output device 206. The components 201 to 206 are connected to each other by a bus 220.

The CPU 201 is responsible for overall control of the fuel management device 100. The memory 202 has, for example, a ROM, a RAM, a flash ROM, or the like. For example, the flash ROM or the ROM stores various types of programs. The various types of programs include a fuel management program according to the embodiment. The RAM is used as a work area of the CPU 201. The program stored in the memory 202 is loaded into the CPU 201 to cause the CPU 201 to execute the coded processing. The memory 202 stores the vehicle information DB 101.

The input device 203 includes a keyboard, a mouse, a touch panel, an operation button, a microphone, a camera, a scanner, and the like. The storage medium I/F 204 controls reading and writing of data on a storage medium (not shown) such as a universal serial bus (USB) memory, a magnetic disk, an optical disk, or the like, according to the control of the CPU 201.

The communication I/F 205 is connected to the network 140 such as the Internet or the like through a communication line, and connected to another device (for example, the vehicles 110, the hydrogen fuel generating devices 102, or the like) via the network 140. The communication I/F 205 manages the interface between the network 140 and the inside of the host device, and controls input/output of data from other devices.

The output device 206 is an example of the output part. The output device 206 includes a display or a speaker. The display includes a touch panel type display.

[Functional Configuration of Fuel Management Device 100]

Figure 3:
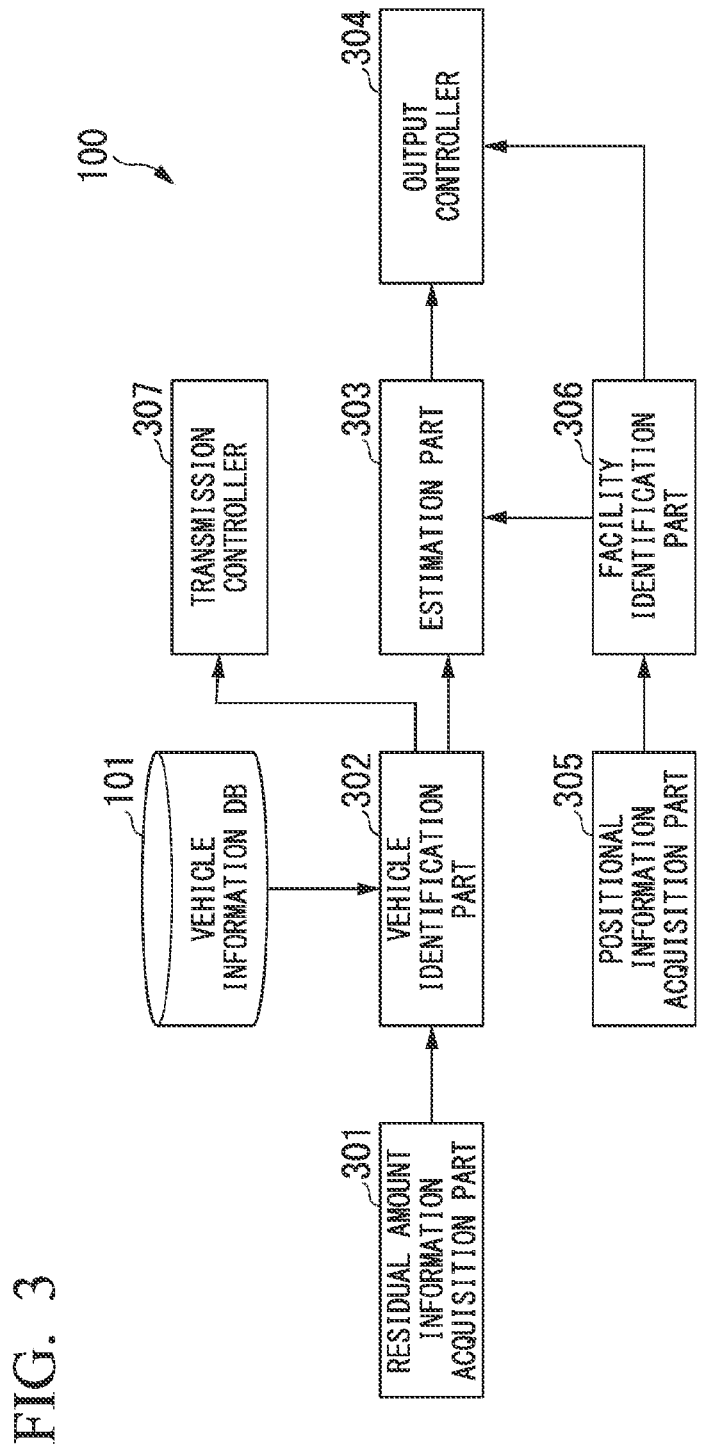
FIG. 3 is a block diagram showing an example of a functional configuration of the fuel management device.

FIG. 3 is a block diagram showing an example of a functional configuration of the fuel management device 100. In FIG. 3, the fuel management device 100 includes a residual amount information acquisition part 301, a vehicle identification part 302, an estimation part 303, an output controller 304, a positional information acquisition part 305, an facility identification part 306, and a transmission controller 307. Each of the above mentioned components are realized by the CPU 201. That is, the CPU 201 realizes a function of each component by executing the fuel management program.

The residual amount information acquisition part 301 acquires residual amount information of each of the plurality of vehicles 110, which are previously registered. The residual amount information is information showing a residual amount of hydrogen fuel. The residual amount information is transmitted from each of the vehicles 110 at each predetermined frequency. The fuel management device 100 receives the residual amount information transmitted from each of the vehicles 110 via the communication I/F 205 and stores the information on the memory 202. The frequency with which each of the vehicles transmits the residual amount information is a previously determined frequency such as every few minutes, every few hours, every half day, or once a day.

The residual amount information acquisition part 301 acquires the residual amount information stored in the memory 202. The residual amount information acquisition part 301 collectively acquires the information stored in the memory 202 at predetermined counting timing. The counting timing may be, for example, timing according to the reception of the counting start of an operation staff, or timing such as once at a predetermined time (every few hours, half a day, or one day). In addition, the counting timing may be timing when the vehicle 110 that has transmitted the residual amount information reaches a certain number. Further, the residual amount information acquisition part 301 is not limited to collectively acquiring the residual amount information at the counting timing, and may acquire each residual amount information whenever the residual amount information is transmitted from each of the vehicles. The residual amount of the hydrogen fuel of each of the vehicles 110 is used for estimation of a supply amount of the hydrogen fuel in the hydrogen station St. For this reason, like the embodiment, when the vehicle 110 has a prescribed tank capacity (5000 g), a refueling amount "5000 g—(residual amount)" can be calculated from the tank capacity and the residual amount. Further, in the fuel management system 1, when another vehicle, a tank capacity of which is different from 5000 g, is included, the residual amount information of the other vehicle may include information indicating a residual amount and information indicating a tank capacity.

In addition, each of the vehicles may transmit a vacant capacity obtained by "(tank capacity)−(residual amount)" to the fuel management device 100 as the residual amount information. In this case, the residual amount information acquisition part 301 may acquire the residual amount information indicating the vacant capacity for each vehicle.

The vehicle identification part 302 identifies the refueling target vehicle in which a residual amount is a first threshold or less on the basis of the residual amount information of each of the vehicles 110. The first threshold is a value showing a level at which refueling of the hydrogen fuel is recommended, and for example, a value of ⅕ (1000 g) of the tank capacity. Further, the first threshold may be set as an arbitrary value according to the setting by the operation staff of the fuel management device 100.

The estimation part 303 estimates a supply amount of the hydrogen fuel in the hydrogen station St (the hydrogen fuel generating device 102). The supply amount is a gross weight of the refueling amount that will be refueled to each of the refueling target vehicles in the hydrogen stations St. The estimation part 303 calculates the refueling amount of each of the refueling target vehicles, and obtains a supply amount by adding all the calculated refueling amounts.

Further, the estimation part 303 may also estimate the supply amount including the storage amount of the hydrogen fuel stored in the pressure accumulator 103. That is, the supply amount may be an amount by further adding the storage amount of the pressure accumulator 103 to the value obtained by adding all the refueling amounts of each of the refueling target vehicles.

The output controller 304 outputs the information based on the estimation result of the estimation part 303 to the output device 206 (for example, a display). For example, when the excess by a predetermined amount or more occurs in the supply amount, the output controller 304 outputs information that the hydrogen fuel of the excess portion for other uses can be supplied together with the information indicating that the refueling target vehicle can be refueled with the hydrogen fuel, as the information based on the estimation result. The other uses are other than supply to the vehicles 110 such as sales to various manufacturing plants. Further, when the excess by the predetermined amount or more does not occur in the supply amount, the output controller 304 may output information indicating that the refueling target vehicle can be refueled with the hydrogen fuel without outputting information indicating that it can be supplied for other uses.

Next, acquisition of the positional information will be described. The positional information acquisition part 305 acquires positional information of each of the plurality of vehicles 110, which are previously registered. The positional information is information about an approximate area (for example, a radius of 5 km) where the vehicle 110 is located from the viewpoint of privacy protection of a user. However, the positional information is not limited to the area information and may be latitude/longitude information where the vehicle 110 is located. Like the residual amount information, the positional information is transmitted from each of the vehicles 110 at a predetermined frequency. The positional information is transmitted from the vehicles 110 to the fuel management device 100 together with the residual amount information. The fuel management device 100 receives the positional information transmitted from each of the vehicles 110 via the communication I/F 205 and stores the positional information on the memory 202.

The facility identification part 306 identifies the hydrogen station St that refuels the refueling target vehicle with hydrogen fuel on the basis of the positional information of the refueling target vehicle. Specifically, the facility identification part 306 identifies the hydrogen station St closest to the refueling target vehicle. More specifically, the facility identification part 306 acquires the positional information of each hydrogen station, and identifies the hydrogen station St closest to the position of the refueling target vehicle on the basis of the positional information of each hydrogen station and the positional information of the refueling target vehicle, which were acquired. The estimation part 303 estimates the supply amount in the hydrogen station St identified by the facility identification part 306. The estimation part 303 estimates the supply amount for each of the hydrogen stations St.

Next, a notice that prompts the refueling target vehicle to refuel the hydrogen fuel will be described. The transmission controller 307 transmits the refueling notice information that prompts the refueling target vehicle to refuel the hydrogen fuel on the basis of the estimation result of the estimation part 303. The transmission controller 307 controls the communication I/F 205 and transmits the refueling notice information to the refueling target vehicle. The refueling notice information is noticed to the user via the display or the speaker provided in the vehicle 110. Further, a transmission destination of the refueling notice information may be a terminal device (for example, a smart phone) previously registered in relation with the vehicle 110. In this case, the refueling notice information is noticed to the user via the terminal device.

Here, among the uses who use the fuel management system 1, there are also users (hereinafter, referred to as "early refueling users") who refuel the hydrogen fuel while there is still sufficient residual amount of the hydrogen fuel in the fuel tank. Specifically, there are also the early refueling users who refuel the hydrogen fuel at about a quarter of tank capacity (1250 g). For this reason, in the embodiment, in the case of the early refueling users, it is possible to change a threshold of the residual amount for identifying as the refueling target vehicle. Specifically describing, the vehicle information DB 101 stores a history of the residual amount immediately before refueling for each of the vehicles 110 (hereinafter, referred to as "residual amount when refueling"). The history of the residual amount when refueling may be, for example, an average of all past residual amount when refueling, or may be an average of residual amount when refueling in a most recent predetermined period.

The vehicle identification part 302 changes the threshold from a first threshold (for example, 1000 g) to a second threshold (for example, 1250 g) on the basis of the history of the residual amount when refueling was performed. The second threshold is a value that is greater than the first threshold. Then, the vehicle identification part 302 identifies the refueling target vehicle using the second threshold. In this way, the vehicle identification part 302 changes the threshold for each early refueling user and identifies the refueling target vehicle. In addition, the estimation part 303 estimates a supply amount on the basis of the refueling amount of the hydrogen fuel refueled to each of a general refueling target vehicle in which the hydrogen fuel is the first threshold or less and the refueling target vehicle of the early refueling user in which the hydrogen fuel is the second threshold or less. In addition, in this case, the transmission controller 307 transmits the refueling notice information to the vehicle 110 used by the early refueling user at the timing according to the history of the residual amount when refueling was performed.

The history of the residual amount when refueling was performed is managed by the fuel management device 100 for each of the vehicles 110 and updated as needed. Specifically, when the hydrogen fuel is refueled, each of the vehicles 110 transmits the information regarding residual amount when refueling which indicates the residual amount when refueling to the fuel management device 100. The fuel management device 100 updates the history of the residual amount when refueling for each of the vehicles 110 using the received information regarding residual amount when refueling.

Next, prediction (estimation) of the supply amount after the predetermined time in the hydrogen station St will be described. In the embodiment, in addition to estimation of the supply amount in real time, the supply amount at the prediction time after the predetermined time can be estimated (predicted). As a prediction method, the calculation result (an average or a learning result) based on various histories may be used. Hereinafter, an example of the prediction will be described.

For example, for each of the vehicles, the refueling target vehicle may be identified on the basis of the current residual amount of the hydrogen fuel, and the consumption of the hydrogen fuel until the predetermined time elapses from the current time. Specifically, when the operation staff has specified the prediction of the supply amount after six hours, for each of the vehicles 110, the refueling target vehicle may be identified on the basis of the current residual amount of the hydrogen fuel, and the consumption (for example, 500 g) of the hydrogen fuel for six hours. A relationship between the time and the consumption can be obtained from past history. The time in the history may include time of day, a day of the week, and a season. In addition, the history may be stored for each of the vehicles 110.

The vehicle identification part 302 changes the threshold used for identification of the refueling target vehicle to a threshold that takes into account consumption for the predetermined time. Specifically, the vehicle identification part 302 changes the threshold from the first threshold (for example, 1000 g) to a third threshold (for example, 1500 g obtained by adding 500 g for six hours). The third threshold is a value greater than the first threshold. Then, the vehicle identification part 302 identifies the refueling target vehicle using the third threshold.

Correspondence between the predetermined time to the prediction time and the third threshold can be obtained from the past history. An example of the correspondence "predetermined time: third threshold" is "6 hours: 1500 g," "9 hours: 2000 g" and "12 hours: 3000 g." Which prediction time to use may be selected by the operation staff. The vehicle identification part 302 may change the third threshold according to the prediction time selected by the operation staff.

Further, for the early refueling user, it is also possible to perform prediction (estimation) of the supply amount after the predetermined time. Even in this case, the threshold used for identification of the refueling target vehicle is changed to a threshold that takes into account the consumption for the predetermined time. Specifically, the vehicle identification part 302 may change the threshold from the second threshold (for example, 1250 g) to the fourth threshold (for example, 1750 g). The fourth threshold is a value greater than the second threshold. Like the third threshold, the fourth threshold corresponds to a predetermined time to the prediction time, and may be changed according to the selection of the operation staff.

In this way, the vehicle identification part 302 changes the threshold according to the predicted time period and identifies the refueling target vehicle. In addition, the estimation part 303 estimates a supply amount for a predicted time on the basis of the refueling amount of the hydrogen fuel refueled to each of the refueling target vehicle in which the residual amount of the hydrogen fuel is the third threshold or less. Accordingly, the transmission controller 307 can transmit the refueling notice information with earlier timing than when the supply amount is predicted in real time.

Further, prediction (estimation) of the supply amount may be simply obtained from the past history (the supply amount for time of day, day of the week, season, and weather). For example, the past history is the history that the supply amount increases in the rainy morning on Monday. Even when such a history is used, the hydrogen station St can understand (predict) how much supply amount is required for each time of day or day of the week.

In addition, in each of the hydrogen stations St, it is possible to understand in advance an off-peak period of the day in which the excess by a predetermined amount or more occurs in the supply amount of the hydrogen fuel, or a rush time period of the day in which the excess by the predetermined amount or more does not occur. In addition, users can be noticed in advance of the rush time period by transmitting the refueling notice information to the vehicles 110. Accordingly, it is also possible to improve congestion in the rush time period.

In addition, in a case temporarily there are many vehicles 110 with little hydrogen fuel, there may be a situation in which the estimation part 303 estimates a lack of supply amount. In this case, the output controller 304 may set the information that prompts sorting of the refueling target vehicles for refueling as the information based on the estimation result. The information that prompts sorting is, specifically, information that prompts sorting the refueling target vehicles with priority given to refueling target vehicles with a small residual amount of hydrogen fuel. The fuel management device 100 may sort a predetermined number of refueling target vehicles according to the selection of the operation staff according to the output of the notice information.

Further, the sorting is not limited to being manually performed by the operation staff, but may be performed automatically by the fuel management device 100. Specifically, the fuel management device 100 may include a sorting part. The sorting part may sort the predetermined number of refueling target vehicles, prioritizing the refueling target vehicles with a small residual amount of hydrogen fuel, when an estimation result in which the supply amount is insufficient is obtained.

In addition, the output controller 304 may output information that prompts to increase or decrease a production output of the hydrogen fuel as the information based on the estimation result of the estimation part 303. For example, when the supply amount is insufficient, the information based on the estimation result may output information that prompts to increase production according to the shortfall. In addition, when the supply amount is excessive, the information based on the estimation result may output information that prompts to reduce according to the excess amount.

In addition, the fuel management device 100 may increase or decrease the production output of the hydrogen fuel by instructing the hydrogen fuel generating devices 102 to increase or decrease the production output of the hydrogen fuel. The instruction may be performed automatically or may be performed manually on the basis of the operation of the operation staff.

Further, each functional part shown in FIG. 3 is realized by executing a program (software) using a hardware processor such as a central processing unit (CPU) or the like. In addition, some or all of the components may be realized by hardware (circuit part; including circuitry) such as large scale integration (LSI), an application specific integrated circuit (ASIC), a field-programmable gate array (FPGA), a graphics processing unit (GPU), or the like, or may be realized by cooperation of software and hardware.

[Example of Information Stored on Vehicle Information DB 101]

Figure 4:
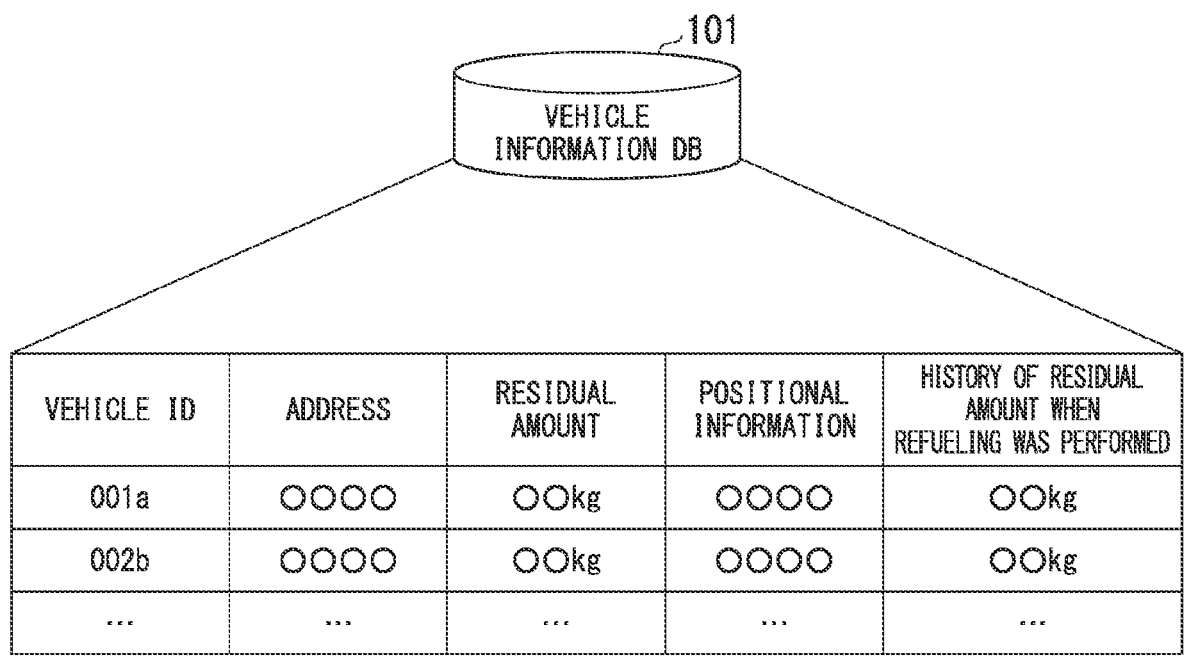
FIG. 4 is a view showing an example of information stored as vehicle information.

FIG. 4 is a view showing an example of information stored on the vehicle information DB 101. In FIG. 4, the vehicle information DB 101 includes each item of a vehicle ID, an address, a residual amount, positional information, and a history of a residual amount when refueling was performed. The vehicle ID is identification information that identifies the vehicles 110. The address indicates a transmission destination of the vehicle 110 on the network 140. The residual amount indicates a residual amount of hydrogen fuel of each of the vehicles 110. The positional information indicates information of an area closest to a position of the vehicle 110. The history of the residual amount when refueling indicates an average of accumulated residual amounts when refueling was performed.

Various types of information shown in the vehicle information DB 101 is updated as appropriate according to the information received from the vehicles 110. Further, the vehicle information DB 101 may be provided in the fuel management device 100, or may be provided in an external device such as an external server or the like.

[Example of Fuel Management Processing Performed by Fuel Management Device 100]

Figure 5:
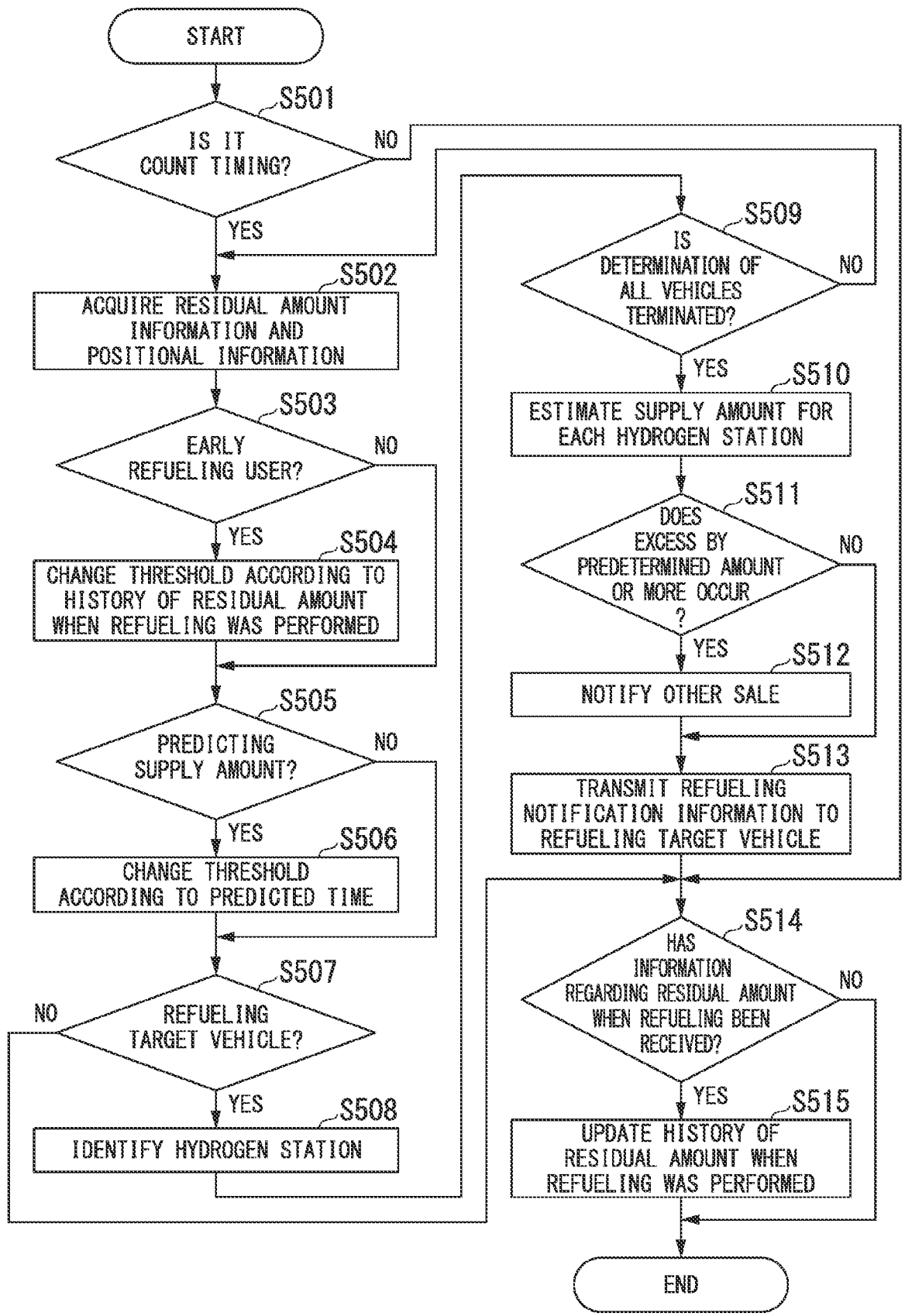
FIG. 5 is a flowchart showing an example of fuel management processing performed by the fuel management device.

FIG. 5 is a flowchart showing an example of fuel management processing performed by the fuel management device 100. In FIG. 5, the fuel management device 100 determines whether it is counting timing. When it is not counting timing, the fuel management device 100 proceeds to processing of step S514. When it is counting timing, the fuel management device 100 acquires residual amount information and positional information of the vehicle 110 that is one of the determination targets from the memory 202.

Then, the fuel management device 100 determines whether a user of the vehicle 110 of the transmission source of the residual amount information and the positional information is an early refueling user (a user who refuels the hydrogen fuel early). If not an early refueling user, the fuel management device 100 proceeds to processing of step S505.

Meanwhile, if it is an early refueling user, the fuel management device 100 changes the threshold used for identification of the refueling target vehicle to the threshold (second threshold) according to the history of the residual amount when refueling was performed.

Next, the fuel management device 100 determines whether it is the estimation (prediction) of the supply amount after the predetermined time. When it is the prediction of the supply amount, the fuel management device 100 changes the threshold used for identification of the refueling target vehicle to the threshold (third threshold) according to the prediction time designated by the operation staff. Further, when the user of the vehicle 110 of the transmission source of the residual amount information and the positional information is the early refueling user and it is the prediction of the supply amount after the predetermined time, in step S503, the threshold used for identification of the refueling target vehicle may be changed from the second threshold to the fourth threshold.

Meanwhile, when not the prediction of the supply amount, i.e., when it is the estimation of the supply amount in real time, the fuel management device 100 proceeds to processing of step S507. Further, when the user of the vehicle 110 of the transmission source of the positional information and the residual amount information is not the early refueling user and when it is not the prediction of the supply amount after the predetermined time, the first threshold is used as the threshold used for identification of the refueling target vehicle.

Next, the fuel management device 100 determines whether the vehicle 110 of the determination target is a refueling target vehicle. Specifically, the fuel management device 100 determines whether the residual amount shown by the residual amount information is the threshold or less. When the vehicle 110 of the determination target is not the refueling target vehicle, i.e., when the residual amount shown by the residual amount information is not the threshold or less, it proceeds to processing of step S514.

Meanwhile, when the vehicle 110 of the determination target is the refueling target vehicle and when the residual amount shown by the residual amount information is the threshold or less, the fuel management device 100 identifies the closest hydrogen station St on the basis of the positional information.

Next, the fuel management device 100 determines whether determination of all the vehicles 110 is terminated. When determination of all the vehicles 110 is not terminated, the fuel management device 100 returns to step S502 and repeats processing of step S502 to step S508. Meanwhile, when determination of all the vehicles 110 is terminated, the fuel management device 100 estimates (predicts) the supply amount of the hydrogen fuel supplied to each of the hydrogen stations St that are identified in step S507.

Then, as a result of the estimation, the fuel management device 100 determines whether the excess by a predetermined amount or more occurs in the supply amount. When the excess by the predetermined amount or more does not occur in the supply amount, the fuel management device 100 uses the display to notify the operation staff that it is possible to refuel the refueling target vehicle with hydrogen fuel, and proceeds to processing of step S513.

Meanwhile, when the excess by the predetermined amount or more occurs in the supply amount, the fuel management device 100 uses the display to notify the operation staff that the hydrogen fuel can be applied to other sales. Further, even in this case, it is possible to notice the operation staff that the refueling target vehicle can be refueled with the hydrogen fuel.

Then, the fuel management device 100 transmits the refueling notice information that prompts to refuel the refueling target vehicle with hydrogen fuel. Accordingly, it is possible to prompt the user of the vehicle 110 to refuel the hydrogen fuel.

Then, the fuel management device 100 determines whether the information regarding residual amount when refueling which indicates that the vehicle 110 has been refueled with the hydrogen fuel is received or not. When the information regarding residual amount when refueling has not been received, the fuel management device 100 terminates a series of processing. Meanwhile, when the information regarding residual amount when refueling has been received from the vehicle 110, the fuel management device 100 updates the history of the residual amount when refueling of the vehicle 110 stored on the vehicle information DB 101 and terminates a series of processing.

The fuel management system 1 of the above-mentioned embodiment estimates the supply amount of the hydrogen fuel in the hydrogen station St on the basis of the refueling amount of the hydrogen fuel that will be refueled to the refueling target vehicle in which the residual amount of the hydrogen fuel is the threshold or less, and outputs the information based on the estimation result. Accordingly, in the hydrogen station St, since it is possible to understand how much the supply amount of the hydrogen fuel is required, it is possible to sell the generated hydrogen fuel without excess or deficiency. In addition, it is possible to reduce occurrence of the vehicles 110 that cannot receive the refueling of the hydrogen fuel. Accordingly, according to the embodiment, it is possible to help to sell hydrogen fuel efficiently.

In addition, the fuel management system 1 according to the embodiment identifies the hydrogen station St that refuels the refueling target vehicle with hydrogen fuel on the basis of the positional information acquired from each of the vehicles 110, and estimates the supply amount in the identified hydrogen station St. Accordingly, in the hydrogen station St closest to the vehicle 110, it is possible to perform the refueling of the hydrogen fuel efficiently.

In addition, the fuel management system 1 according to the embodiment transmits the notice information of prompting to refuel the refueling target vehicle with hydrogen fuel on the basis of the estimation result of the supply amount. Accordingly, it is possible to prompt the user to refuel the hydrogen fuel. Accordingly, it is possible to refuel the vehicles 110 (user) with hydrogen fuel efficiently.

In addition, the fuel management system 1 according to the embodiment changes the threshold used for identification of the refueling target vehicle on the basis of the history of the residual amount when refueling was performed, and identifies the refueling target vehicle using the changed threshold. Accordingly, since supply amount can be estimated in consideration of the refueling of the early refueling user, estimation accuracy of the supply amount can be improved. In addition, it is possible to prompt the early refueling user to refuel the hydrogen fuel at appropriate timing.

In addition, the fuel management system 1 according to the embodiment outputs the information indicating that the hydrogen fuel of the excess portion can be supplied to other use in addition to supply to the vehicle 110 as the information based on the estimation result when the excess by the predetermined amount or more occurs in the estimated supply amount. Accordingly, when the excess by the predetermined amount or more occurs in the generated hydrogen fuel, it is possible to prompt sales to various manufacturing plants or the like. Accordingly, it is possible to suppress loss related to a work or process required for water electrolysis and support efficient utilization of renewable energy.

Hereinafter, while the mode for carrying out the present invention has been described using the embodiment, the present invention is not limited to this embodiment by no means and various modifications and substitutions may be made without departing from the scope of the present invention. In addition, while the example using the hydrogen produced by water electrolysis or the like was described in the embodiment, instead of this or in addition to this, for example, it is also possible to use hydrogen purchased and delivered from large-scale hydrogen production facility or hydrogen storage facility. Accordingly, sales can also be made more efficient.

What is claimed is:

1. A fuel management device comprising:
a residual amount information acquisition part configured to acquire residual amount information indicating a residual amount of hydrogen fuel of each of a plurality of vehicles that are previously registered;
a vehicle identification part configured to identify a refueling target vehicle in which a residual amount of hydrogen fuel is a first threshold or less on the basis of the residual amount information of each vehicle;
an estimation part configured to estimate a supply amount of hydrogen fuel in a supply facility of hydrogen fuel on the basis of a refueling amount of hydrogen fuel to be refueled to each of the refueling target vehicles;
an output controller configured to output information based on the estimation result of the estimation part to an output part,
wherein the vehicle identification part identifies a vehicle, to which a refueling of the hydrogen fuel with respect to the vehicle has been performed when the residual amount of the hydrogen fuel is greater than the first threshold, on the basis of a history of the residual amount when the refueling vehicle for each of the vehicles among the plurality of vehicles, changes the first threshold of the vehicle identified by the vehicle identification part to a second threshold which is a value greater than the first threshold, and identifies the refueling target vehicle by using the second threshold, and
wherein the estimation part estimates a supply amount of the hydrogen fuel on the basis of refueling amounts of the hydrogen fuel to be refueled to each of the refueling target vehicles in which the residual amount of the hydrogen fuel is the first threshold or less and each of the refueling target vehicles in which the residual amount of the hydrogen fuel is the second threshold or less; and
controlling the refueling target vehicle, via transmitted notification data, to travel to the supply facility identified by the fuel management device.

2. The fuel management device according to claim 1, comprising:
a positional information acquisition part configured to acquire positional information of each of the plurality of vehicles; and
a facility identification part configured to identify the supply facility that refuels the refueling target vehicle with hydrogen fuel on the basis of the positional information of the refueling target vehicle,
wherein the estimation part estimates the supply amount in the supply facility identified by the facility identification part.

3. The fuel management device according to claim 1, comprising a transmission controller configured to transmit notice information that prompts to refuel the refueling target vehicle with hydrogen fuel on the basis of the estimation result.

4. The fuel management device according to claim 1, wherein the output controller outputs to the output part information indicating that hydrogen fuel of an excess portion is able to be supplied for uses other than supply to the vehicle as the information based on the estimation result when an excess of a predetermined amount or more occurs in the supply amount estimated by the estimation part.

5. A fuel management system comprising a plurality of vehicles that are previously registered and a fuel management device configured to manage a residual amount of hydrogen fuel of each of the plurality of vehicles,
wherein the fuel management device comprises:
a residual amount information acquisition part configured to acquire residual amount information indicating a residual amount of hydrogen fuel of each of the plurality of vehicles;
a vehicle identification part configured to identify a refueling target vehicle in which a residual amount of hydrogen fuel is a first threshold or less on the basis of the residual amount information of each vehicle;
an estimation part configured to estimate a supply amount of hydrogen fuel in supply facility of hydrogen fuel on the basis of a refueling amount of hydrogen fuel to be refueled to each of the refueling target vehicles;
an output controller configured to output information based on the estimation result of the estimation part to an output part,
wherein the vehicle identification part identifies a vehicle, to which a refueling of the hydrogen fuel with respect to the vehicle has been performed when the residual amount of the hydrogen fuel is greater than the first threshold, on the basis of a history of the residual amount when the refueling vehicle for each of the vehicles among the plurality of vehicles, changes the first threshold of the vehicle identified by the vehicle identification part to a second threshold which is a value greater than the first threshold, and identifies the refueling target vehicle by using the second threshold, and
wherein the estimation part estimates a supply amount of the hydrogen fuel on the basis of refueling amounts of the hydrogen fuel to be refueled to each of the refueling target vehicles in which the residual amount of the hydrogen fuel is the first threshold or less and each of the refueling target vehicles in which the residual amount of the hydrogen fuel is the second threshold or less; and
controlling the refueling target vehicle, via transmitted notification data, to travel to the supply facility identified by the fuel management device.

6. A fuel management method executed by a computer of a fuel management device, the method comprising:
a residual amount information acquisition step of acquiring residual amount information indicating a residual amount of hydrogen fuel of each of a plurality of vehicles that are previously registered;
a vehicle identification step of identifying a refueling target vehicle in which a residual amount of hydrogen fuel is a first threshold or less on the basis of the residual amount information of each vehicle;
an estimation step of estimating a supply amount of hydrogen fuel in supply facility of hydrogen fuel on the basis of a refueling amount of hydrogen fuel to be refueled to each of the refueling target vehicles;
an output control step of outputting information based on the estimation result of the estimation step to an output part,
wherein the vehicle identification step identifies a vehicle, to which a refueling of the hydrogen fuel with respect to the vehicle has been performed when the residual amount of the hydrogen fuel is greater than the first threshold, on the basis of a history of the residual amount when the refueling vehicle for each of the vehicles among the plurality of vehicles, changes the first threshold of the vehicle identified by the vehicle identification step to a second threshold which is a value greater than the first threshold, and identifies the refueling target vehicle by using the second threshold, and wherein the estimation step estimates a supply amount of the hydrogen fuel on the basis of refueling amounts of the hydrogen fuel to be refueled to each of the refueling target vehicles in which the residual amount of the hydrogen fuel is the first threshold or less and each of the refueling target vehicles in which the residual amount of the hydrogen fuel is the second threshold or less; and a step for controlling the refueling target vehicle, via transmitted notification data, to travel to the supply facility identified by the fuel management device.

7. A computer-readable non-transient storage medium, on which a program is stored to execute processing in a computer of a fuel management device, the processing comprising:

acquiring residual amount information indicating a residual amount of hydrogen fuel of each of a plurality of vehicles that are previously registered;

identifying a refueling target vehicle in which a residual amount of hydrogen fuel is a first threshold or less on the basis of the residual amount information of each vehicle;

estimating a supply amount of hydrogen fuel in supply facility of hydrogen fuel on the basis of a refueling amount of hydrogen fuel to be refueled to each of the refueling target vehicles;

outputting information based on the estimation result estimated to an output part, wherein the identifying identifies a vehicle, to which a refueling of the hydrogen fuel with respect to the vehicle has been performed when the residual amount of the hydrogen fuel is greater than the first threshold, on the basis of a history of the residual amount when the refueling vehicle for each of the vehicles among the plurality of vehicles, changes the first threshold of the vehicle identified by the identifying to a second threshold which is a value greater than the first threshold, and identifies the refueling target vehicle by using the second threshold, and wherein the estimating estimates a supply amount of the hydrogen fuel on the basis of refueling amounts of the hydrogen fuel to be refueled to each of the refueling target vehicles in which the residual amount of the hydrogen fuel is the first threshold or less and each of the refueling target vehicles in which the residual amount of the hydrogen fuel is the second threshold or less; and controlling the refueling target vehicle, via transmitted notification data, to travel to the supply facility identified by the fuel management device.

* * * * *